UNITED STATES PATENT OFFICE.

ALFRED HOFFMAN, OF BROOKLYN, NEW YORK, ASSIGNOR, BY DIRECT AND MESNE ASSIGNMENTS, TO ALCO DEO COMPANY, A CORPORATION OF NEW JERSEY.

CHEMICAL PROCESS.

1,082,424. Specification of Letters Patent. Patented Dec. 23, 1913.

No Drawing. Application filed March 19, 1908. Serial No. 422,121.

*To all whom it may concern:*

Be it known that I, ALFRED HOFFMAN, a citizen of the United States, and a resident of Brooklyn, in the county of Kings and State of New York, have invented a certain new and useful Chemical Process, of which the following is a full, clear, and exact description, such as will enable others skilled in the art to which it appertains to carry out the same.

This invention relates broadly to the art of converting given substances into others having different physical or chemical characteristics, as through the instrumentality of a catalytic agent. Inasmuch, however, as certain of the features essentially characteristic of this invention prominently appear in the hereinafter described mode of catalytically transforming a ketone into another compound, such as acetone into di-acetone alcohol, it will be conducive to clearness to disclose this invention through a particular reference to such an embodiment thereof.

One object residing within the contemplation of this invention is to formulate a cumulative distillation method involving a novel manner of utilizing a substantially insoluble catalytic agent, whereby the chemical structure or physical nature of a given compound while in a liquid form may be readily altered.

Another object of this invention is to render available a process whereby the predetermined or end product may be obtained in a highly concentrated and uncontaminated form by causing the conversion of the liquid raw material or basis of the reaction to take place only in the presence of comparatively small quantities of the end product, and by promoting the conversion under these conditions by means of a suitable catalytic agent.

This invention furthermore proposes a method of producing di-acetone alcohol from a suitable ketone, such as acetone, by bringing concentrated acetone undiluted with substantial quantities of the di-acetone alcohol into the presence of a catalytic agent, such as calcium hydroxid while at an elevated temperature.

In general, this invention seeks to provide a process of the nature disclosed which, from a practical operative standpoint, will possess a high degree of efficiency, and which from a chemical aspect, will be of the greatest possible simplicity, being comprised of but few steps, all of which may be readily carried out at a minimum of cost to accomplish the purposes intended.

Other objects and advantages will be in part obvious and in part pointed out in the following description.

As casting a more pronounced light upon the nature and purposes of this invention, it may at the outset be pointed out that if a certain class of substances be subjected to the influence of a catalytic agent, such agent will cause such substances to be decomposed to a partial extent only into another compound. Such decomposition will not always be complete, apparently because the newly formed compound when present in comparatively large amounts, seems to act as a poison, so to speak, for the catalyst and prevent the latter from exerting a further influence. To illustrate by way of a concrete example, I may point out that if a suitable hydroxid, such as calcium hydroxid, is placed in a vessel containing strong acetone and heated, then, a small quantity of such acetone will be converted into di-acetone alcohol, but under the same conditions, it is not practical to obtain a liquid containing a large percentage of di-acetone alcohol. So also, the converse of this condition is also true, that is to say, this calcium hydroxid if added to a vessel containing di-acetone alcohol in comparatively concentrated form, and if the contents of such vessel be at an elevated temperature, then a vigorous action will take place, and a back or re-conversion will ensue, until the larger part of the di-acetone alcohol has been changed into acetone. In other words, there is a state of equilibrium that will bear a definite proportion to the temperature conditions, the character of the present reagents and the like.

In the course of my work, I have made the discovery that a highly concentrated form of di-acetone alcohol may be readily obtained by subjecting acetone to the peculiar action of catalytic hydroxids, such as calcium hydroxid, under suitable conditions. Thus, I have discovered that di-acetone alcohol, which I believe to possess the following chemical structure;

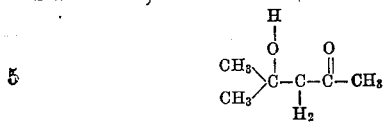

may be very satisfactorily made from acetone by placing the latter in a suitable containing vessel, heating it to a distilling temperature, and then conveying the vaporized acetone to a converter and treating as follows: The evolved vapors will be in the main composed of acetone, and are received in a suitable condenser and there liquefied. This hot liquid resulting from the condensation of the acetone, is then brought into contact with the catalyst, which preferably will be composed of a hydroxid, such as calcium hydroxid, and to this end, the condensed acetone vapors may be allowed to run through a receptacle containing the calcium hydroxid in granular or other porous form.

It may here be stated that I prefer to employ a catalyst which is difficultly soluble in the liquids with which it contacts, but inasmuch as most catalysts will to a greater or less extent dissolve, I may make use of a neutralizing agent for said dissolved catalyst, as will be hereinafter perceived.

The condensed products of distillation, consisting mainly of acetone, when brought into contact with the calcium hydroxid will be in part decomposed, that is the result will be a small percentage of di-acetone alcohol, and a larger percentage of unconverted acetone. This composite liquid formed by the catalyst may be said to represent a state of equilibrium between the converted and the unconverted substances, while in the presence of the catalyst at the employed temperature.

Now, my invention proposes the return of this composite liquid to one of the distilling vessels, which may either be the same vessel containing the original charge of acetone, or may be a neighboring vessel forming a member of the series of vessels arranged and co-related to carry out my process on a commercial basis. When the composite liquid has been added to the original charge of acetone, it will be perceived that the same will increase in its percentage content of di-acetone alcohol. This percentage of di-acetone alcohol will not impair or injuriously affect a continuation of the process, for the reason that di-acetone alcohol possesses a much higher boiling point than acetone, its boiling point being some 50° above the boiling point of water, i. e., about 150° centigrade. In consequence of this, the original charge of acetone will be progressively increased as to its di-acetone alcohol contents, and similarly decreased in its acetone contents, for the effect of the distillation will be to evolve acetone vapors only, and these will in turn condense and run through and into contact with the catalyst, and then after being converted in part will be returned through a suitable conduit to the original charge, thus increasing its strength in di-acetone alcohol. This series of operations may be continued until at last a product very rich in di-acetone alcohol will result.

It will be observed that the catalyst might possibly be returned in small amounts to the mother liquid which has been enriched beyond the point of equilibrium from the standpoint of the presence of the catalyst. This would be very undesirable in most cases, as it might bring about a very considerable re-conversion of the di-acetone alcohol to acetone. This possibility I have been able to meet by adding to the mother liquid undergoing enrichment a suitable quantity of a reagent adapted to neutralize the effect of the returned catalyst, or destroy the latter, as the case may be. Thus, in the application of my invention to the production of di-acetone alcohol in accordance with the above disclosed procedure, I have employed an organic acid, such as succinic acid (others being of course commercially available) and have found that the same is very effective for the purpose of preventing a re-conversion due to traces of the catalyst being brought into the mother liquid during the process of enrichment.

By way of specific reference to the production of di-acetone alcohol by means of my process, I may point out that various substances are available as a basis of the reaction, although ordinary acetone is, from many standpoints, the most suitable. Thus, as will be apparent to those skilled in this art in view of the foregoing disclosure, certain compounds relating to acetone, as the homologous ketones, may be used as the basis of the reaction. Or to put it in another way, many, but not necessarily all, substances characterized by the following elemental grouping:

may be used for producing a corresponding ketonic alcohol, according to my process.

Di-acetone alcohol as obtained by my process is a clear colorless liquid, having a pungent odor somewhat resembling ordinary acetone. Its boiling point is in the neighborhood of 150° C. and it may be burned by means of a wick. It is a good solvent for many substances. This product has heretofore been known only as a laboratory curiosity and has never before been produced commercially on a large scale, owing to the unavailability of any economical process for so doing.

Inasmuch as the essential features of this invention could be very easily utilized by others skilled in this art in view of this disclosure when taken in connection with current knowledge, I desire the above description to be regarded in an illustrative rather than in a limiting sense, and I also desire it to be understood that the language of the following claims is to be interpreted as covering the generic features of this invention, which, from the aspect of the prior art, might be said to be comprehended thereby.

Having thus described my invention, I claim as new and desire to secure by Letters Patent:

1. A process for producing di-acetone alcohol consisting in subjecting a liquid containing a comparatively large percentage of acetone to a temperature below about 150° C. but sufficiently high to evolve acetone vapors, condensing such vapors at a distance from such liquid, causing the condensed acetone to infiltrate through a pervious granular mass of calcium hydroxid while at an elevated temperature, whereby a relatively small proportion of such condensed acetone will be catalytically transformed into di-acetone alcohol, adding the resultant composite fluid to a quantity of previously distilled liquid, continuing the distillation of such mixture to remove some of its contained acetone to increase its percentage content of di-acetone alcohol, and again subjecting the distilled-off acetone to the action of calcium hydroxid.

2. A process for producing di-acetone alcohol consisting in subjecting a liquid containing acetone to a temperature between the boiling point of acetone and the boiling point of di-acetone alcohol, condensing the evolved acetone vapors at a distance from such liquid, causing the condensed acetone to infiltrate through a pervious mass of a difficultly soluble hydroxid while at an elevated temperature, whereby a relatively small proportion of such condensed acetone will be catalytically transformed into di-acetone alcohol, adding the resultant composite fluid to a quantity of previously distilled liquid, continuing the distillation of such mixture to remove some of its contained acetone so as to increase its percentage content of di-acetone alcohol, and again subjecting the distilled-off acetone to the action of a hydroxid.

3. A process for producing di-acetone alcohol consisting in subjecting a liquid containing acetone to a temperature between the boiling point of acetone and the boiling point of di-acetone alcohol, condensing the evolved acetone vapors at a distance from such liquid, causing the condensed acetone to infiltrate through a pervious mass of a difficultly soluble catalytic agent while at an elevated temperature, whereby a portion of such condensed acetone will be transformed into di-acetone alcohol, adding the resultant composite fluid to a quantity of previously distilled liquid, continuing the distillation of such mixture to remove some of its contained acetone so as to increase its percentage content of di-acetone alcohol, and again subjecting the distilled-off acetone to the action of a catalytic agent.

4. A process for producing di-acetone alcohol consisting in subjecting a liquid containing acetone to a temperature below 150° C., condensing the evolved vapors at a distance from such liquid, causing the condensed vapors to intimately contact with a catalytic agent while at an elevated temperature, whereby a portion of the acetone in such condensed vapors will be transformed into di-acetone alcohol, adding the resultant composite fluid to a quantity of previously distilled liquid, and continuing the distillation of such mixture to remove more or less of its percentage content of acetone so as to increase its proportion of di-acetone alcohol.

5. A process for producing di-acetone alcohol consisting in subjecting a liquid containing acetone to a temperature below 150° C., condensing the evolved vapors apart from such liquid, causing the condensed vapors to intimately contact with a catalytic agent to convert some of the acetone into di-acetone alcohol, adding the resultant composite fluid to some previously distilled liquid.

6. A process for producing di-acetone alcohol consisting in subjecting a liquid containing acetone to a temperature below 150° C., condensing the evolved vapors apart from such liquid, causing the condensed vapors to intimately contact with a catalytic agent to convert a portion of the acetone therein into di-acetone alcohol, adding the resultant composite fluid to some previously distilled liquid, and continuing the distillation of such mixture to remove more or less of its acetone so as to increase its percentage content of di-acetone alcohol.

7. A process for producing di-acetone alcohol consisting in subjecting a liquid containing acetone to a temperature below 150° C., condensing the evolved acetone vapors apart from such liquid, causing the condensed acetone to infiltrate through a pervious mass of a difficultly soluble catalytic agent whereby a portion of such condensed acetone will be transformed into di-acetone alcohol, adding the resultant composite fluid to a quantity of previously distilled liquid, continuing the distillation of such mixture to remove some of its contained acetone so as to increase its percentage content of di-acetone alcohol, and again subjecting the distilled-off acetone to the action of a catalyst.

8. A process for producing di-acetone alcohol consisting in subjecting a liquid containing acetone to a temperature below 150° C., condensing the evolved acetone vapors apart from said liquid, causing the condensed acetone to infiltrate through a pervious mass of a difficultly soluble hydroxid, whereby a proportion of such condensed acetone will be catalytically transformed into di-acetone alcohol, adding the resultant composite fluid to a quantity of previously distilled liquid, continuing the distillation of such mixture to remove some of its contained acetone so as to increase its percentage content of di-acetone alcohol, and again subjecting the distilled-off acetone to the action of a hydroxid.

9. A process for producing di-acetone alcohol consisting in subjecting a liquid containing a comparatively large percentage of acetone to a temperature below 150° C., condensing the evolved acetone vapors apart from said liquid, causing the condensed acetone to infiltrate through a pervious granular mass of calcium hydroxid, whereby a proportion of such condensed acetone will be catalytically transformed into di-acetone alcohol, adding the resultant composite fluid to a quantity of previously distilled liquid, continuing the distillation of such mixture to remove some of its contained acetone so as to increase its percentage content of di-acetone alcohol, and again subjecting the distilled-off acetone to the action of calcium hydroxid.

10. A process for producing di-acetone alcohol consisting in subjecting a liquid containing a comparatively large percentage of acetone to a temperature below 150° C., but sufficiently high to evolve acetone vapors, condensing such vapors at a distance from such liquid, causing the condensed acetone to infiltrate through a pervious granular mass of calcium hydroxid while at an elevated temperature, whereby a relatively small proportion of such condensed acetone will be catalytically transformed into di-acetone alcohol, adding the resultant composite fluid to a quantity of previously distilled liquid containing a small percentage of a substance adapted to render inactive any small amount of transported calcium hydroxid, continuing the distillation of such mixture to remove some of its contained acetone to increase its percentage content of di-acetone alcohol, and again subjecting the distilled-off acetone to the action of calcium hydroxid.

11. A process for producing di-acetone alcohol consisting in subjecting a liquid containing acetone to a temperature between the boiling point of acetone and the boiling point of di-acetone alcohol, condensing the evolved acetone vapors apart from such liquid, causing the condensed acetone to infiltrate through a pervious mass of a difficultly soluble hydroxid while at an elevated temperature, whereby a relatively small proportion of such condensed acetone will be catalytically transformed into di-acetone alcohol, adding the resultant composite fluid to a quantity of previously distilled liquid containing a substance adapted to render inactive small amounts of any transported hydroxid, continuing the distillation of such mixture to remove some of its contained acetone so as to increase its percentage content of di-acetone alcohol, and again subjecting the distilled-off acetone to the action of a hydroxid.

12. A process for producing di-acetone alcohol consisting in subjecting a liquid containing acetone to a temperature between the boiling point of acetone and the boiling point of di-acetone alcohol, condensing the evolved acetone vapors apart from said liquid, causing the condensed acetone to infiltrate through a pervious mass of a difficultly soluble catalytic agent while at an elevated temperature, whereby a portion of such condensed acetone will be transformed into di-acetone alcohol, adding the resultant composite fluid to a quantity of previously distilled liquid containing a small percentage of a substance adapted to render inactive small amounts of the transported catalytic agent, continuing the distillation of such mixture to remove some of its contained acetone so as to increase its percentage content of di-acetone alcohol, and again subjecting the distilled off acetone to the action of a catalytic agent.

13. A process for producing di-acetone alcohol consisting in subjecting a liquid containing acetone to a temperature below 150° C., condensing the evolved vapors apart from said liquid, causing the condensed vapors to intimately contact with a catalytic agent while at an elevated temperature, whereby a portion of the acetone of such condensed vapor will be transformed into di-acetone alcohol, adding the resultant composite fluid to a quantity of previously distilled liquid containing a small amount of a substance adapted to render inactive any transported catalytic agent, and continuing the distillation of the mixture to remove more or less of its percentage content of acetone so as to increase its proportion of di-acetone alcohol.

14. A process for producing di-acetone alcohol consisting in subjecting a liquid containing acetone to a temperature below 150° C., causing the evolved vapors to be condensed apart from the liquid, passing the condensed vapors into intimate contact with a catalytic agent to convert some of the condensed acetone into di-acetone alcohol, adding the resultant composite fluid to some previously distilled liquid containing a substance adapted to render inactive any transported catalytic agent, and continuing the distillation in like manner.

15. A process for producing di-acetone alcohol consisting in subjecting a liquid containing acetone to a temperature below 150° C., condensing the evolved vapors apart from such liquid, causing the condensed vapors to intimately contact with a catalytic agent to convert a portion of the acetone therein into di-acetone alcohol, adding the resultant composite fluid to a previously distilled liquid containing a small quantity of a substance adapted to render inactive any transported catalytic agent, and continuing the distillation of such mixture to remove more or less of the acetone so as to increase its percentage content of di-acetone alcohol.

16. A process for producing di-acetone alcohol consisting in subjecting a liquid containing acetone to a temperature below 150° C., condensing the evolved acetone vapors apart from such liquid, causing the condensed acetone to infiltrate through a pervious mass of a difficultly soluble catalytic agent, whereby a portion of such condensed acetone will be transformed into di-acetone alcohol, adding the resultant composite fluid to a quantity of previously distilled liquid containing a small percentage of a substance adapted to render inactive any transported catalytic agent, continuing the distillation to remove some of its contained acetone so as to increase its percentage content of di-acetone alcohol, and again subjecting the distilled-off acetone to the action of a catalyst.

17. A process for producing di-acetone alcohol consisting in subjecting a liquid containing acetone to a temperature below 150° C., condensing the evolved acetone vapors apart from said liquid, causing the condensed acetone to infiltrate through a pervious mass of a difficultly soluble hydroxid, whereby a proportion of such condensed acetone will be catalytically transformed into di-acetone alcohol, adding the resultant composite fluid to a quantity of previously distilled liquid containing a small percentage of a substance adapted to render inactive any small amounts of transported hydroxid, continuing the distillation of such mixture to remove some of its contained acetone so as to increase its percentage content of di-acetone alcohol, and again subjecting the distilled off acetone to the action of a hydroxid.

18. A process for producing di-acetone alcohol consisting in subjecting a liquid containing a comparatively large percentage of acetone to a temperature below 150° C., condensing the evolved acetone vapors apart from said liquid, causing the condensed acetone to infiltrate through a pervious granular mass of calcium hydroxid, whereby a proportion of such condensed acetone will be catalytically transformed into di-acetone alcohol, adding the resultant composite fluid to a quantity of previously distilled liquid containing a small percentage of a substance adapted to render any transported calcium hydroxid inactive, continuing the distillation of such mixture to remove some of its contained acetone so as to increase its percentage content of di-acetone alcohol, and again subjecting the distilled-off acetone to the action of calcium hydroxid.

19. A process for producing a polymerid consisting in subjecting a liquid containing a comparatively large percentage of a ketone to a temperature below 150° C., condensing the evolved vapor apart from said liquid, causing the condensed vapors to infiltrate through a pervious granular mass of calcium hydroxid, whereby a portion of such condensed vapor will be catalytically transformed into the polymerid, adding the resultant composite fluid to a quantity of previously distilled liquid, continuing the distillation of such liquid to remove some of its contained ketone so as to increase its percentage content of the polymerid, and again subjecting the distilled-off ketone to the action of calcium hydroxid.

20. A process for producing a polymerid consisting in subjecting a liquid containing a ketone to a temperature below 150° C., condensing the evolved vapors apart from said liquid, causing the condensed vapors to infiltrate through a pervious mass of a difficultly soluble hydroxid, whereby a proportion of such condensed vapor will be catalytically transformed into the polymerid, adding the resultant composite fluid to a quantity of previously distilled liquid, continuing the distillation of such mixture to remove some of its contained ketone so as to increase its percentage content of the polymerid, and again subjecting the distilled-off matter to the action of a hydroxid.

21. A process for producing a polymerid consisting in subjecting a liquid containing a ketone to a temperature below 150° C., condensing the evolved vapors apart from such liquid, causing the condensed vapors to infiltrate through a pervious mass of a difficultly soluble mass of a catalytic agent, whereby a portion of such condensed vapor will be transformed into the polymerid, adding the resultant composite fluid to a quantity of previously distilled liquid, continuing the distillation to remove some of the ketone so as to increase its percentage content of the polymerid, and again subjecting the distilled-off matter to the action of a catalyst.

22. A process for producing a polymerid consisting in subjecting a liquid containing a ketone to a temperature below 150° C., condensing the evolved vapors apart from such liquid, causing such condensed vapors to intimately contact with a catalytic agent to convert a portion of the ketone therein into the polymerid, adding the resultant composite fluid to some previously distilled liquid, and continuing the distillation of such mixture to remove more or less of the ketones so as to increase its content of the polymerid.

23. A process for producing a polymerid consisting in subjecting a liquid containing a ketone to a temperature below 150° C., causing the evolved vapors to be condensed apart from the liquid, passing the condensed vapors into intimate contact with a catalytic agent to convert some of the contained ketone into a polymerid, adding the resultant composite fluid to some previously distilled liquid, and continuing the distillation in like manner.

24. A process for producing a polymerid consisting in subjecting a liquid containing a ketone to a temperature below 150° C., condensing the evolved vapors apart from said liquid, causing the condensed vapors to intimately contact with a catalytic agent while at an elevated temperature, whereby a portion of such vapors will be converted into the polymerid, adding the resultant composite fluid to a quantity of previously distilled liquid, and continuing the distillation of the mixture to remove more or less of the ketone so as to increase its proportion of the polymerid.

25. A process for producing a polymerid consisting in subjecting a liquid containing a ketone to a temperature between the boiling point of such ketone and the boiling point of the polymerid, condensing the evolved ketone vapors apart from such liquid, causing the condensed vapors to infiltrate through a pervious mass of a difficultly soluble catalytic agent while at an elevated temperature, whereby a portion of such condensed vapor will be transformed into the polymerid, adding the resultant composite fluid to a quantity of previously distilled liquid containing a ketone, continuing the distillation of such mixture to remove some of its contained ketones so as to increase its percentage content of the polymerid, and again subjecting the distilled off ketone to the action of a catalyst.

26. A process of producing a polymerid consisting in subjecting a liquid containing a ketone to a temperature between the boiling of such ketone and the boiling point of the polymerid, condensing the envolved vapors apart from such liquid, causing the condensed vapors to infiltrate through a pervious mass of difficultly soluble hydroxid while at an elevated temperature, whereby a relatively small proportion of such contained ketone will be catalytically transformed into the polymerid, adding the resultant composite fluid to a quantity of previously distilled liquid, continuing the distillation of such mixture to remove some of its contained ketone so as to increase its percentage content of the polymerid, and subjecting the distilled off acetone to the action of a hydroxid.

27. A process of producing a polymerid consisting in subjecting a liquid containing a comparatively large amount of ketone to a temperature below 150° C., but sufficiently high to envolve ketone vapors, condensing such vapors apart from such liquid, causing the condensed vapors to infiltrate through a pervious mass of calcium hydroxid while at an elevated temperature, whereby a relatively small proportion of such condensed ketones will be catalytically transformed into the polymerid, adding the resultant composite fluid to a quantity of previously distilled liquid, continuing the distillation of such liquid to remove some of its contained ketone to increase its percentage content of the polymerid, and again subjecting the distilled off ketone to calcium hyroxid.

28. A process of the nature disclosed consisting in removing some of the ketone from a ketone containing material, treating such removed ketone with a catalytic agent to transform it in part into a material containing a polymerid, and then effecting a separation of the polymerid from its associated ketone.

29. A process of the nature disclosed consisting in treating a ketone containing material with a catalytic agent to transform it in part into a polymerid, then effecting a separation of the polymerid from its associated dissimilar matter, and then again subjecting such matter to the action of a catalyst.

30. A process of the nature disclosed consisting in producing vapors of a given substance, condensing said vapors to a liquid, causing said liquid to flow in contact with a catalytic agent adapted to convert a proportion of said liquid into a material characterized by a different boiling point than said substance, then conveying said mixed liquids into a separate receptacle from that containing the catalytic agent, then distilling said mixed liquids to produce a vapor composed mainly of the given substance, then treating said vapor as before, and repeating the cycle until substantially all of said given substance has been converted into said material.

31. A process of the nature disclosed for continuously converting a normally liquid substance having a lower boiling point into a normally liquid material having a higher boiling point, consisting in evaporating a body of the liquid substance at a temperature lower than the boiling point of the liquid material, continuously condensing the resultant vapors to a liquid, causing said liquid continuously to flow in contact with an agent adapted to convert a portion thereof into said other liquid material, then adding the resultant mixed liquids to a body of previously treated mixed liquids to enrich the same in the content of the said material, then evaporating said enriched body of mixed liquids, and treating the vapors of the substance as before.

32. A process of the nature disclosed for effecting a complete polymerization of organic bodies, derived from an alcohol by the removal of two atoms of hydrogen, by means of an agent effective only to polymerize a portion of such body when in contact therewith, consisting in causing a stream of such body in liquid form continuously to flow in contact with such agent, continuously adding the mixed liquids of such body and the formed polymerid to a body of previously converted mixed liquids, to increase the percentage of polymerid therein, and continuously removing unpolymerized portions of said mixed body, and repeating the operation thereon.

33. A process of the nature disclosed for effecting a complete polymerization of ketone by means of a reaction capable only of partially polymerizing a unit quantity of said ketone, consisting in subjecting a quantity of said ketone in liquid form to said reaction to partially polymerize the same, removing the mixed product beyond the influence of said reaction and separating some of the ketone from the polymerid-containing liquid, resubjecting said ketone to said reaction to partially polymerize the same, adding the resultant mixed product to the remaining quantity of mixed products, and repeating until the said quantity has been completely polymerized.

In testimony that I claim the foregoing as my invention, I have hereunto affixed my signature, in the presence of the subscribing witnesses, this 17th day of March, 1908.

ALFRED HOFFMAN.

Witnesses:
GEORGE HOFFMAN,
H. F. BURNS.